United States Patent
Sullivan

[15] 3,697,175
[45] Oct. 10, 1972

[54] CAMERA ATTACHMENT FOR COPYING PHOTOGRAPHIC TRANSPARENCIES

[72] Inventor: Robert T. Sullivan, Norwood, Mass.
[73] Assignee: Polaroid Corporation, Cambridge, Mass.
[22] Filed: Dec. 18, 1970
[21] Appl. No.: 99,395

[52] U.S. Cl. .................355/39, 95/1.1, 95/12, 355/66, 355/67, 353/63
[51] Int. Cl. ............................................G03l 27/32
[58] Field of Search ..........95/1, 1.1, 12, 11; 355/62, 355/63, 67, 39, 66; 353/63

[56] References Cited

UNITED STATES PATENTS 803,385  10/1905  Wynne ......................353/63

Primary Examiner—Samuel S. Matthews
Assistant Examiner—E. M. Bero
Attorney—Brown and Mikulka, William D. Roberson and Robert L. Berger

[57] ABSTRACT

A print-copying attachment or accessory device primarily for a so-called "close-up" camera incorporating an electronic flash component with variable intensity control means. Light rays from the flash element which, conventionally, would fall directly upon the frontal surface of a subject are redirected by the attachment so as to be incident upon the rear surface of a photographic transparency mounted therein. At the same time a correct focus and correct average light level are established, the latter being capable of adjustment to accommodate to differences in density of the transparencies.

26 Claims, 7 Drawing Figures

PATENTED OCT 10 1972

INVENTOR.
ROBERT T. SULLIVAN

BY

Brown and Mikulka
ATTORNEYS

INVENTOR.
ROBERT T. SULLIVAN

BY

Brown and Mikulka
ATTORNEYS

3,697,175

CAMERA ATTACHMENT FOR COPYING PHOTOGRAPHIC TRANSPARENCIES

BACKGROUND OF THE INVENTION

Field of the Invention

This invention relates to photography and, more particularly, to an improved camera attachment device for making copies, e.g., enlarged reflection prints in black-and-while or color, from small photographic transparencies.

Description of the Prior Art

The one-step photographic process employing diffusion transfer means incorporated with a camera for producing photographic prints in a matter of seconds following an exposure is now well established in the field of photography. Among its exponents is a close-up camera known as the "CU-5" self-processing camera sold by Polaroid Corporation. This camera incorporates positive focusing means, an electronic flash unit in the form of a ring light, and means for rapidly and releasably fastening various attachments thereto. An alternating current power pack having a light-level control for varying the intensity of the illumination complements the camera.

The CU-5 camera is described in detail in the following U. S. patents:

| Patent No. | Inventor(s) | Date of Issue |
|---|---|---|
| 3,295,425 | Herbert A. Bing Philip Boone | January 3, 1967 |
| 3,330,193 | Gary Kaess | July 11, 1967 |
| 3,479,937 | Robert T. Sullivan | November 25, 1967 |

BRIEF SUMMARY OF THE INVENTION

The present invention is directed to an accessory or attachment device for rapidly and conveniently converting a close-up camera to a copying camera for reproducing photographic transparencies in the form of enlarged reflection prints. The device is particularly adapted to complement a camera of a self-processing type whereby the copies may be produced rapidly, either in black-and-white or color.

A principal object of the present invention is to provide an easily-installable attachment for a close-up camera of established wide utility for converting the camera to one having an additional photographic transparency-copying capability.

Other objects are to provide a camera attachment of the character described which is adapted to releasable installation on a self-processing type of camera thus enabling the rapid copying of an original transparency in the form of an enlarged reflection print; to provide an attachment, as stated, embodying lens means complementing the lens of the camera to provide a correct focus; to provide an attachment of the type indicated which is of simple form and easily fabricated, largely of a plastic material by an injection molding process; to provide an attachment of the type detailed which is adapted to readily and positively mount a mounted or unmounted transparency.

Other objects of the invention will in part be obvious and will in part appear hereinafter.

BRIEF DESCRIPTION OF THE DRAWINGS

The novel features that are considered characteristic of the invention are set forth with particularity in the appended claims. The invention itself however, both as to its organization and its method of operation, together with additional objects and advantages thereof will best be understood from the following description of the preferred embodiment when read in connection with the accompanying drawings wherein like numbers have been employed in the different figures to denote the same parts and wherein:

DETAILED DESCRIPTION

Figure 1:
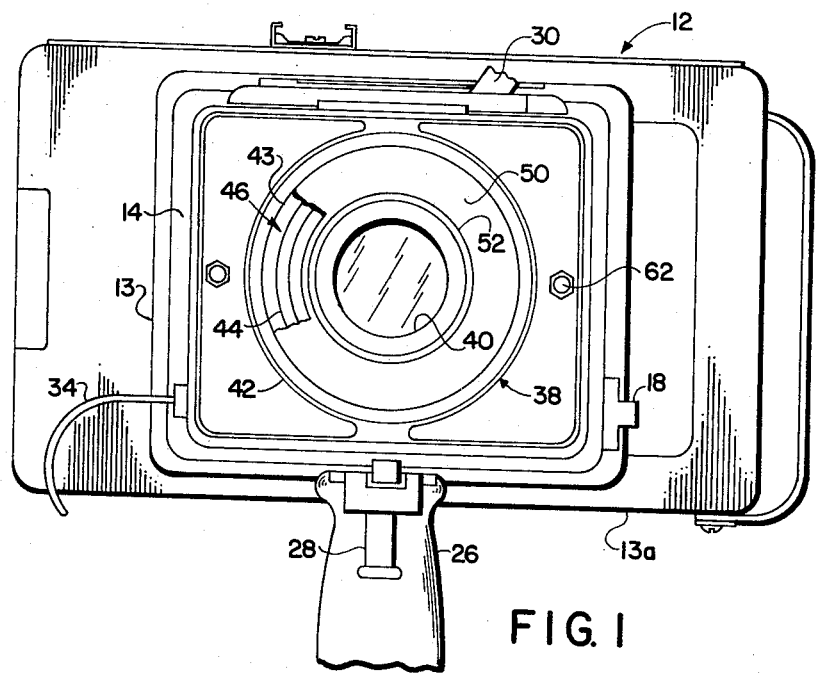
FIG. 1 is a diagrammatic front view of a camera adapted to cooperate with the transparency-copying attachment of the invention.
Figure 2:
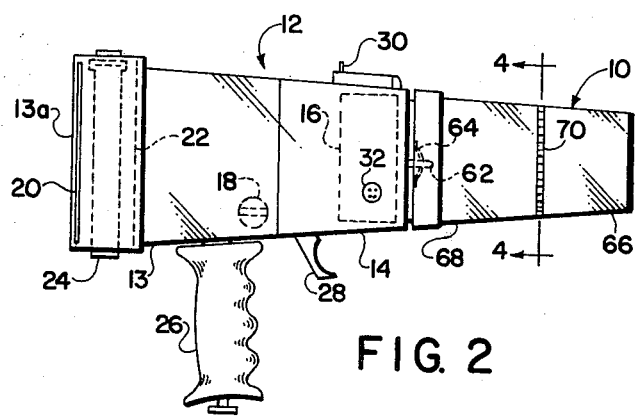
FIG. 2 is a diagrammatic side view of the camera with the attachment mounted thereon.
Figure 3:
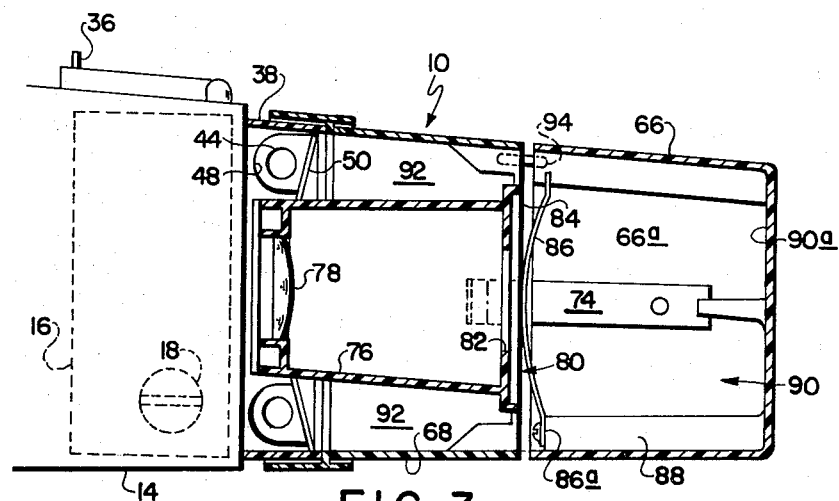
FIG. 3 is a diagrammatic sectional side view of the attachment.
Figure 4:
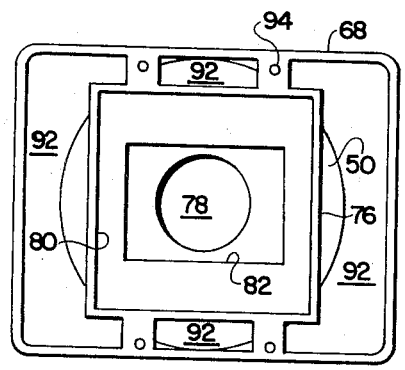
FIG. 4 is a diagrammatic front view of the rear section of the attachment, taken along the line 4—4 of FIG. 2.

The transparency-copying attachment unit 10 of the present invention may best be understood by first referring to the camera 12 (FIGS. 1 and 2) upon which it is mounted for operation. The camera includes a rear housing portion 13 adapted to contain photosensitive film material and a front housing portion 14 containing a lens and exposure mechanism indicated by the dotted line 16. The two housing portions 13 and 14 provide a given lens-to-film-plane distance. Although having no special significance relative to the present invention, the housing portions 13 and 14 are releasably attached to one another by latching means actuated by the knob 18, thus permitting the insertion of additional intermediate housing portions to vary the lens-to-film-plane distance and the magnification of a subject in uses other than that described herein.

Figure 7:
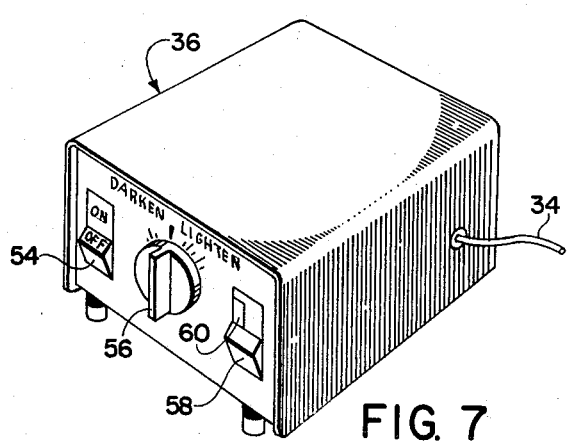
FIG. 7 is a diagrammatic perspective view of a power pack illustrating means for controlling the light-level of the electronic flash.

The rear housing 13 includes a chamber 13a mounting a plurality of film units adapted to produce completed prints through a diffusion transfer process when withdrawn between compressive means (not shown) and through a slot 20, following each exposure at a film or focal plane 22. The camera further comprises a carrying strap 24, a pistol grip 26, a trigger shutter-release 28, a diaphragm-setting control-lever 30, and a recessed plug 32, connecting by a cable and socket 34 with a power-pack unit 36 (FIG. 7).

The camera front housing 14 includes an electronic flash unit 38 in the form of a built-in ring-light generally surrounding the lens aperture 40. The unit comprises a circular metallic casing 42 and a ring-type gaseous flash-tube 44 mounted in an annular compartment 46. At the rear of the compartment is a reflector 48 and across its front is an annular light-transmitting plate 50. The aforesaid components surround a circular forwardly-extending flange 52 defining an aperture leading to the lens aperture 40.

The unit 36 may, appropriately, comprise an AC power pack which builds up a high-potential direct-current charge on capacitor means thereof and applies the potential to the electrodes of the flash tube; then applies a high-voltage pulse to the tube through the intermediary of cable 34 and the shutter contacts ("X" synchronization) to trigger discharge of the capacitor means and produce the flash. The unit 36 includes an on-off switch 54, a light-level control knob-and-indicator 56 and a test switch 58 including a pilot light 60. The knob 56 provides, through a variable resistor, a continuously-adjustable control of the charge on the capacitor means to vary the intensity of the flash.

Figure 5:
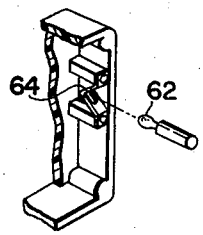
FIG. 5 is a diagrammatic fragmentary view of releasable fastening means of the camera and attachment.
Figure 6:
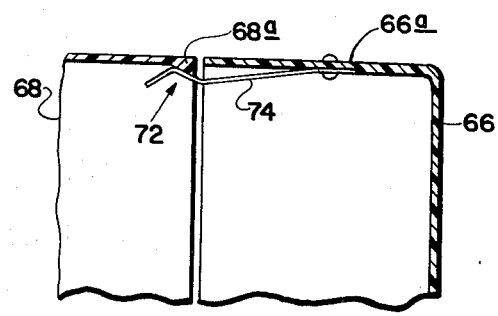
FIG. 6 is a diagrammatic fragmentary sectional view of latching means of the front and rear sections of the attachment.

Mounting of the attachment device 10 on the camera 12 is achieved by a pair of laterally-spaced protruding lugs 62 of the camera which are releasably-gripped by a pair of resilient mating recesses or sockets 64 (FIGS. 2 and 5) of the attachment. The device 10 is held in correct functional position with respect to the camera.

Referring now more particularly to the attachment device or unit 10, a pair of housing sections thereof formed, for example, of a molded acrylic, namely a front section 66 and a rear section 68 are pivotally connected together by a hinge 70, e.g., a "piano hinge", whereby the front section may be pivoted away from the rear section thus enabling access to the interior of each section. The rear section 68 is releasably attached to the front of the camera 12 by components 62 and 64, as above described. The two sections are held at closed position by a latch 72 composed of a resilient arm 74 attached to the wall portion 66a so as to releasably engage the tapered inwardly-extending enlarged wall portion 68a. It will be noted that the outer walls of the housing sections 66 and 68 generally conform to the forwardly-inclined taper of the camera walls.

The rear housing section 68 comprises a rearwardly-tapering, rectangular, light-tight tube member 76. At its innermost extremity is mounted a lens 78 of given characteristics optically aligned with and complementing the lens of the camera. Assuming, for example, the camera lens located within the area 16 to be a multi-element f/4.5 to f/45 lens of 127mm. (3 inch) focal length, the lens 78 may, suitably, be a positive lens having a power of 7.7 diopters. At the forward end of the front section, namely, at the forward extremity of the tube 76 a recessed slot-like compartment 80 having a rectangular aperture 82 formed therein and an open front 84 provides mounting means for a photographic transparency, e.g., a mounted 35mm. slide or the like positioned along an extension of the optical axis passing through the camera lens at 16 and the complementary lens 78. A pair of flat springs 86 fastened at their extremities 86a to a boss 88 are adapted, automatically, to bear against the slide mount and hold it firmly positioned within the compartment 80 when the housing sections are closed. As will be apparent, a modified resilient means could be employed for a similar purpose. The transparency may be inserted or removed when the section 66 is pivoted to open position.

A chamber 90 is formed within the front section 66. Its inner walls 90a are treated with a light-reflecting substance such as a white paint or a metallic coating material. A plurality of passages 92 are formed in the rear section 68 surrounding the tube 76 so as to extend forwardly from the flash tube 44 into the chamber 90. Light rays from the flash tube are thus conducted through the passages 92 to the reflecting surface 90a and thence to the rear surface of the transparency positioned in the mounting compartment 80. It will be appreciated that this reflecting surface 90a also serves to diffuse the light rays from the flash tube 44 prior to their passing through the transparency. As will be apparent, the rays, in passing through the transparency become image-forming rays which, through the instrumentality of the complementary lens 78 and the camera lens, are correctly focused at the film plane 22. Alternatively, an unmounted strip of 35 mm. film may be mounted within the compartment 80, a plurality of pins 94 being adapted to enter the film sprocket-holes to correctly position a given frame of the film at the aperture 82.

As previously intimated, the camera 12 is of a type adapted to expose and rapidly process a film pack comprising a plurality of film units. The film units may generally be assumed to be either of a black-and-white or a color category, of larger dimensions than the original transparency and capable of producing reflection prints. However, no limitation as to a self-processing type of film and camera and to size or category of print is to be construed from the foregoing.

A flash intensity suitable for illumination of transparencies of average density may be provided by a given setting of the knob 56 of the power-pack unit 36. Where marked deviation from such a density occurs, adjustments of the knob setting may be performed to vary the flash light level.

It will be understood that the subject invention may be practiced or embodied in other ways without departing from the spirit or character thereof. The preferred embodiment described herein is, therefore, to be regarded as illustrative and not restrictive, the scope thereof being indicated by the appended claims and all variations which come within the meaning of the claims are intended to be embraced therein.

I claim:

1. A photographic attachment for a camera including means defining a film plane, an objective lens of given focal characteristics positioned to form an image at such film plane and means for illuminating a subject positioned in front of such camera to facilitate exposure operations utilizing such objective lens, said attachment comprising:

an opaque housing;

means on said housing for mounting said attachment to the front of such camera, said housing being disposed adjacent both such camera lens and such illuminating means when said attachment is mounted on such camera, said housing including means for defining a light conducting path between such camera illuminating means and such camera lens when 50 mounted, said means for defining the light conducting path being arranged to intercept a substantial portion of the light rays emitted from such camera illuminating means and redirecting such light rays toward such camera lens; and means for mounting a photographic transparency at a selected position along said light conducting path so that such transparency is illuminated by such light rays and the image thereon may be focused on such film plane.

2. The attachment of claim 1 wherein said housing overlies such camera lens and such illuminating means when mounted on such camera.

3. The attachment of claim 1 wherein said housing encloses such camera lens and such illuminating means when mounted on such camera.

4. The attachment of claim 1 additionally including means, mounted along said light conducting path defining means to receive such light rays intermediate such transparency and such camera lens, for complementing such camera lens to focus such transparency image at such film plane.

5. The attachment of claim 1 wherein said light conducting path defining means comprises a light reflecting wall surface.

6. The attachment of claim 1 including means within said housing for diffusing such light rays prior to their passing through such transparency.

7. The attachment of claim 1 wherein said light conducting path defining means includes means for separating those of such light rays passing from such illuminating means to such transparency at a given instant from those of such light rays passing from such transparency to such camera lens at such given instant.

8. The attachment of claim 1 wherein said housing comprises two pivotally connected sections which may be pivotally opened with respect to each other to facilitate the insertion of a photographic transparency into said housing and the subsequent removal of such transparency from said housing when said housing is mounted on said camera.

9. The attachment of claim 4 wherein said light conducting path defining means includes a light-tight tube extending between said means for complementing such camera lens and said transparency mounting means.

10. The attachment of claim 4 wherein said means for complementing such camera lens comprises a lens.

11. The attachment of claim 7 wherein such illuminating means is in the form of a ring light substantially surrounding such camera lens and said seperating means is tubular in configuration and is imposed between such camera lens and such ring light when said attachment is mounted on such camera.

12. The attachment of claim 8 wherein said transparency mounting means comprises a pair of members each of which is respectively positioned in one of said two sections of said housing, whereby they cooperate to fixedly position a photographic transparency within said housing when said sections thereof are disposed in their closed position.

13. An attachment device for a camera including means defining a film plane, lens means of given focal characteristics and an electronic flash means, the device utilizing such flash means for making copies of photographic transparencies mounted in said device, said device comprising:

housing means releasably attachable to the front of such camera, said housing means serving to define an optical axis located to be aligned with the optical axis of such camera lens means when said device is mounted on such camera;

means for mounting a photographic transparency within said housing means along said optical axis of said device;

lens means mounted within said housing along said optical axis of said device for complementing such camera lens means to focus an image of such transparency at such film plane; and light conducting passage means within said housing for transmitting light rays from such flash means through such transparency towards such camera lens means and such film plane when said device is mounted on such camera, said light conducting passage means including a light-tight tube extending between said complementing lens means and said transparency mounting means, a chamber formed within said housing means so as to be located at that side of said transparency mounting means, and of a transparency when mounted therein, which is remote from said tube and said complementing lens means and means providing a light reflecting wall surface within said chamber.

14. A camera attachment device, as defined in claim 13, wherein such electronic flash means is in the form of a ring light surrounding such camera lens and said passage means comprises a plurality of individual passages surrounding said tube and leading away from such camera within said housing exteriorly of said tube.

15. A camera attachment device, as defined in claim 13, wherein said housing means comprises first and second pivotally connected housing sections, said first section being releasably attachable to such camera.

16. A camera attachment device, as defined in claim 15, wherein said first housing section encloses said complementing lens, a part of said passage means, and said transparency mounting means.

17. A camera attachment device, as defined in claim 15, wherein said second housing section forms said chamber therewithin.

18. A camera attachment device, as defined in claim 15, wherein when said second housing section is pivoted to an open position whereby access to said transparency mounting means is provided to enable insertion or removal of a transparency.

19. A camera attachment device, as defined in claim 15, wherein said transparency mounting means comprises a recessed slot-like compartment formed in a surface of said first housing section facing said second housing section.

20. A camera attachment device, as defined in claim 19, wherein said compartment has a central aperture formed therein adjacent to said tube.

21. A camera attachment device, as defined in claim 15, wherein said means for mounting a transparency comprises resilient means attached to said second housing section which bears against a mount holding such transparency.

22. A camera attachment device, as defined in claim 21, wherein said resilient means are thus adapted to bear against such transparency mount automatically when said second housing section is at closed position.

23. A camera attachment device, as defined in claim 15, wherein is included latching means for holding said second housing section at closed position.

24. A camera attachment device, as defined in claim 13, wherein said camera is of a close-up self-processing type enabling the making of enlarged copy prints of such transparencies rapidly, in black-and-white or in color.

25. A camera attachment device, as defined in claim 20, wherein are included a plurality of positioning pins projecting from the surface of said first housing section facing said second housing section for correctly positioning each frame of an unmounted film strip at said compartment aperture.

26. In combination with a close-up self-processing camera including means defining a film plane, lens means of given focal characteristics positioned to form an image at said film plane and an electronic flash unit surrounding said lens means, a device utilizing said flash means for making copies of miniature photographic transparencies and comprising:

housing means;

means for releasably attaching said housing means to said camera, said housing means defining an optical axis aligned with the optical axis of said camera lens means when said device is attached to said camera;

means for mounting a photographic transparency within said housing means;

lens means for complementing said camera lens means mounted within said housing means; and means within said housing means for conducting light rays from said flash unit sequentially through such transparency, said complementing lens means, and said camera lens means to said film plane so that the image on such transparency is focused on said film plane.

* * * * *